Oct. 21, 1930.  F. H. WINTER  1,779,302
POWER FACTOR REGULATOR
Filed Nov. 9, 1929

Inventor:
Fred H. Winter,
by Charles T. Mullen
His Attorney.

Patented Oct. 21, 1930

1,779,302

UNITED STATES PATENT OFFICE

FRED H. WINTER, OF SCHENECTADY, NEW YORK, ASSIGNOR TO GENERAL ELECTRIC COMPANY, A CORPORATION OF NEW YORK

POWER-FACTOR REGULATOR

Application filed November 9, 1929. Serial No. 406,127.

My invention relates to power factor regulators and particularly to regulators of the vibratory type in which the main control contact is operative in response to power factor.

A common type of power factor regulator for three phase systems is one where the main control magnet of a Tirrill regulator comprises two coils, one connected to be responsive to the voltage between two of the line conductors while the other is connected to be responsive to the current in the other line conductor. Such a regulator will then tend to hold unity power factor, for under those conditions the fluxes of the coils will be in quadrature while under any other power factor there will be a component of the flux due to the current coil which is either in phase or in opposition with the flux due to the voltage responsive coil depending upon whether the current leads or lags the voltage, or vice versa, this being determined by how the coils are connected. Such a regulator, however, can only operate to hold unity power factor, whereas it is often only practicable to hold a lower power factor. Furthermore, the operation of such a regulator is detrimentally effected by variations in line voltage and current which change the magnitude of the resultant of the two fluxes and hence their pull.

It is an object of my invention to provide a new and improved power factor regulator with novel means whereby it may be adjusted to regulate for any desired power factor.

It is a further object of my invention to provide an improved power factor regulator whose operation is independent of changes in the magnitude of current and voltage.

My invention will be better understood from the following description taken in connection with the accompanying drawing, and its scope will be pointed out in the appended claims.

Figure 1:
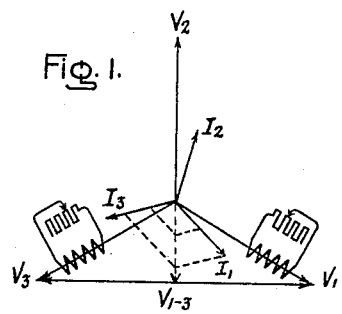
Figure 2:
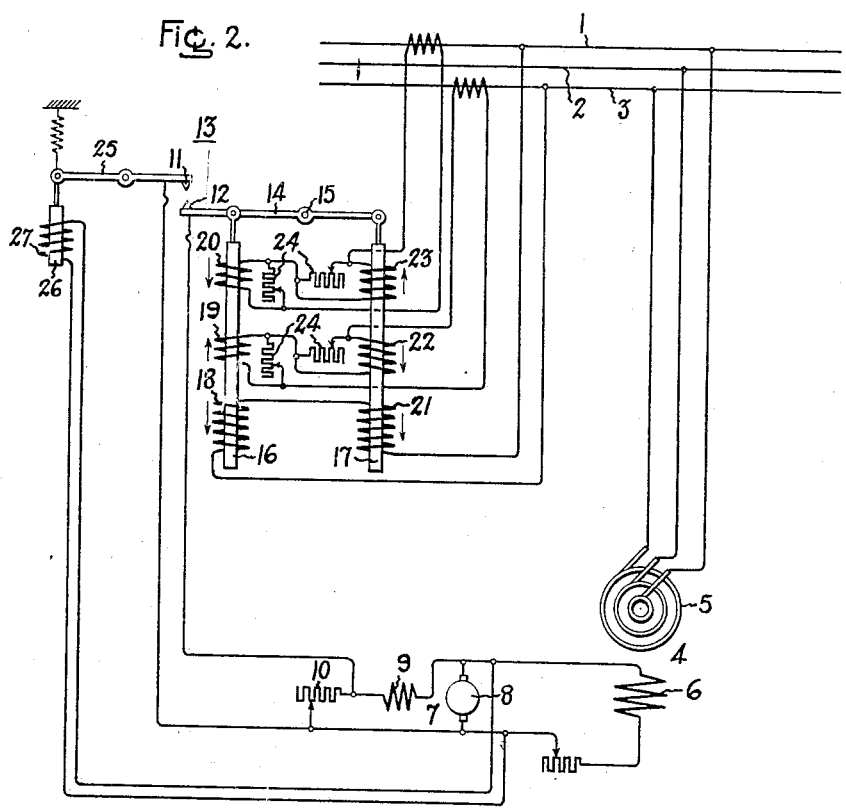

In the drawing, Fig. 1 is a vector diagram illustrating a principle of operation of my invention, while Fig. 2 is a diagrammatic representation of a particular embodiment of my invention as applied to a regulator of the Tirrill type acting on a synchronous condenser.

Referring first to Fig. 2, conductors 1, 2 and 3 represent a three phase supply circuit whose power factor it is desired to regulate. Connected to this circuit is a synchronous condenser 4, having an armature 5 and field winding 6. Connected to energize field winding 6 is an exciter 7, comprising an armature 8 and shunt field 9, in whose circuit is a resistance 10, whose terminals are connected to the control contacts 11 and 12 of regulator 13. As is well known, a synchronous motor or condenser may be made to take a leading or lagging current merely by varying its field excitation. Thus it is possible by proper regulation of the excitation of machine 4 to maintain constant power factor on circuit 1, 2, 3, for as the power factor of the circuit tends to change, machine 4 may be made to draw sufficient wattless current of the proper phase to neutralize the wattless current tending to disturb the power factor. Contact 12, which is the main control contact of regulator 13 is movable in response to changes in the power factor of circuit 1, 2, 3, through the action of the following means. Supporting this contact is a contact arm 14 pivoted at 15. Pivotally connected to arm 14 on opposite sides of pivot 15 are two core armatures 16 and 17. As shown, each of these armatures has three operating coils, armature 16 having coils 18, 19 and 20, while armature 17 has operating coils 21, 22 and 23. As shown, coils 18 and 21 are connected so as to be responsive to the voltage across conductors 1 and 3 of the supply circuit, coils 19 and 22 are connected so as to be responsive to the current in supply conductors 3, while coils 20 and 23 are connected so as to be responsive to the current in line conductor 1. Coils 18 and 21, 19 and 22, and 20 and 23 are shown connected in series although it is obvious that they might equally well be connected in parallel. For the sake of simplicity coils 19, 20, 22 and 23 are constructed with an equal number of turns. Coils 18 and 21 also have an equal number of turns. The arrow placed alongside each coil denotes the relative direction of its magnetomotive force. Each of coils 19, 20, 22 and 23 have connected across their terminals a separate adjustable impedance 24 whereby the relative values of the current in each of them may be regulated. The purpose of this is to permit the device to be adjusted so as to hold any desired power factor.

The operation is as follows: Assume that supply circuit 1, 2, 3 is energized and that it is desired to hold a power factor of 95% lagging. Consider only armature 16 and its three operating coils 18, 19 and 20. If the impedance 24 across each of the coils 19 and 20 is so adjusted that the current through coil 19 is roughly about three fourths of that through coil 20, the resultant of the fluxes produced by them is in quadrature with that produced by coil 18. Thus, referring to Fig. 1, $V_1$, $V_2$ and $V_3$ represent the voltage to neutral for each phase of circuit 1, 2, 3, while $I_1$, $I_2$, and $I_3$ represent the respective line currents. $V_{1-3}$ represents the line voltage across conductors 1 and 3, which is the voltage to which coil 18 is responsive, while $I_1$ and $I_3$ represent the currents to which coils 20 and 19 respectively, are responsive. As shown the resultant of current $I_1$ and about three fourths of $I_3$ is in quadrature with voltage $V_{1-3}$, and as the flux in each coil is in phase with the current in it the resultant of the fluxes produced by coils 18 and 19 will be in quadrature with that produced by coil 18, when impedances 24 are properly adjusted. If then, assuming that core 17 is not present, the combined effect of coils 18, 19 and 20 just balance the weight of core 16 at this power factor, changes in power factor will swing the resultant flux produced by coils 19 and 20 so that a component of this flux will be in phase or in opposition to that produced by coil 18, thereby tending to raise or lower contacts 12, which through the well known operation of the Tirrill regulator may be made to cause synchronous condenser 4 to restore the power factor by supplying the necessary leading or lagging current as the case may be. It should be noted that my invention is not limited to the particular connector of the current coils illustrated. All that is necessary is that the currents in these coils be so adjusted that the resultant flux produced thereby is in quadrature with the flux due to the voltage coil. Thus the current coils could be made responsive to $I_2$ and $I_3$.

Such a regulator, however, would be unsatisfactory from a practical standpoint as variations in line current or voltage or both would upset the balance. However, with the addition of core 17 and its three coils 21, 22, and 23, the movement of contact 12 would be independent of current and voltage changes. This is because coils 22 and 23 are so connected that their magnetomotive forces are reversed with respect to those of coils 19 and 20 respectively. Therefore, if impedances 24 across coils 22 and 23 are adjusted so that their currents are equal to those in coils 19 and 20 respectively, arm 14 will be balanced. If, however, the power factor varies, the component of the resultant current responsive flux in each core will oppose the voltage responsive flux in one core while aiding that in the other core, thereby disturbing the balance.

Contact 11 is mounted on pivotally mounted lever 25, which in turn is pivotally connected to core 26. Surrounding core 26 is anti-hunting coil 27 which is connected across the terminals of exciter 7. The operation of the Tirrill regulator is so well understood in the art that a detailed description of its operation is deemed unnecessary.

Although I have shown my invention applied to a regulator of the Tirrill type it will of course be obvious to those skilled in the art that it might equally well be applied to any regulator of the excitation of synchronous machines having a movable control member which it is desired to make responsive to variations in power factor, without departing from my invention in its broader aspect.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is,—

1. In a power factor regulator for polyphase systems, a potential coil, a plurality of current coils energized respectively in accordance with different phase currents of a polyphase system, means for varying the relative magnitudes of the currents in said current coils, and movable means responsive to variations in the magnitude of the vector sum of the fluxes produced by all of said coils.

2. In a power factor regulator, in combination, a polyphase circuit, a potential coil, means connecting said coil to said circuit so that the current therein is responsive to one of the voltages of said circuit, a plurality of current coils, separate means for connecting said coils to said circuit so that the current in each is responsive in phase to a different current of said circuit, means for varying the relative magnitude of the currents in the current coils until the vector sum of the fluxes produced thereby is in quadrature with the flux produced by the potential coil, at any given power factor, and regulating means responsive to variations in the magnitude of the vector sum of the fluxes produced by all of the coils.

3. In a power factor regulator, in combination, a three phase circuit, a potential coil connected to be responsive to the voltage between two of the conductors of said circuit, a pair of current coils connected to be responsive to the current in each of the said conductors respectively, means for varying the relative current in said current coils, and means operable in accordance with variations in the magnitude of the vector sum of the fluxes produced by all three of said coils.

4. In a regulator of the vibratory type for polyphase apparatus, a main control magnet comprising a core armature and a plurality of coils thereon, at least one of said coils being a potential coil and at least two of said coils being current coils carrying currents of different phase, and means associated with each current coil for varying the magnitude of the current through it with respect to the current in the remaining current coil.

5. In a power factor regulator of the vibratory type for polyphase apparatus, means for making the main control contact thereof responsive to variations in power factor only, comprising a pair of elements for producing a variable force in response to variations in power factor, current and voltage, the variations due to power factor being equal and opposite in each element, the variations due to current and voltage being equal and similar in each element, means for applying said forces to said contact in such a way that the variations due to current and voltage cancel each other while variations due to power factor tend to aid each other in moving said contact, and anti-hunting means cooperating with the control contact.

6. In a power factor regulator of the vibratory type for polyphase apparatus, means for making the main control contact thereof responsive to variations in power factor only, comprising a pair of elements for producing a variable force in response to variations in power factor, current and voltage, adjustable means associated with each element for making it responsive to variations from any desired power factor, the variations due to power factor being equal and opposite in each element, the variations due to current and voltage being equal and similar in each element, means for applying said forces to said contact in such a way that the variations due to current and voltage cancel each other while variations due to power factor tend to aid each other in moving said contact, and anti-hunting means cooperating with the control contact.

7. In a power factor regulator for three phase apparatus, a movable member for initiating control of the power factor of said apparatus, a pair of operating elements for said member, each of said elements comprising a core armature and three corresponding operating coils, one of the coils of each element being connected to be responsive to one of the phase voltages of said apparatus, each pair of remaining corresponding coils being connected to be responsive to a different one of the polyphase currents of said apparatus, each one of said corresponding current responsive coils producing a flux which is in phase opposition to that of the other, means for varying the current in each of said last mentioned coils until the resultant flux produced by the two current responsive coils associated with each core armature is in quadrature with the flux produced by the voltage responsive coil associated therewith, for any given power factor, and means for mechanically connecting said cores to said member in such a way that the forces on the cores due to variations in the resultant flux in the cores as a result of variations in current and voltage will cancel each other.

8. In an adjustable power factor system, in combination, a polyphase supply circuit, a synchronous condenser connected thereto, a regulator for the excitation of said synchronous condenser, said regulator including a main control element, operating means for said element comprising a coil connected to be responsive to one of the voltages of said system, a pair of coils connected to be responsive to two different currents respectively, of said system, said coils having a common magnetic circuit and means for varying the relative magnitude of the currents in said last mentiond coils.

9. In an electrical system, in combination, a polyphase supply circuit, a synchronous condenser connected thereto, a regulator for the excitation of said synchronous condenser, said regulator including a main control element, operating means for said main control element, said operating means comprising two sets of corresponding coils, means connecting said coils to said circuit so that variations in current and voltage of said circuit will cause corresponding variations in the magnitude of the resultant flux produced by each set while variations in power factor will cause opposite variations in the magnitude of the resultant flux produced by each set of coils, and separate means responsive to the variations in magnitude of the vector resultant flux produced by each set of coils for producing forces on said main control element which cancel each other as the result of current and voltage changes but which aid each other in producing motion of said element when the power factor of said circuit changes.

10. In an electrical system, in combination, a polyphase circuit, a synchronous condenser connected thereto, a regulator for the excitation of said synchronous condenser, said regulator including a main control element, operating means for said main control element, said operating means comprising two sets of corresponding coils, means connecting a pair of said corresponding coils to said circuit so that they are responsive to the voltage of said circuit, separate means connecting two of the other pairs of corresponding coils to said circuit so that each pair is responsive to a different current in said circuit, means for varying the relative magnitude of currents in said last mentioned coils, and separate means responsive to variations in the magnitude of the vector resultant flux produced by each set of coils for applying forces to said main control elements.

11. A power factor regulator for polyphase systems having, in combination, a potential coil, a plurality of current coils energized respectively in accordance with different phase currents of a polyphase system, and movable means responsive to variations in the magnitude of the vector sum of the fluxes produced by all of said coils.

12. A power factor regulating system having, in combination, a polyphase circuit, a potential coil, means connecting said coil to said circuit so that the current therein is responsive to one of the voltages of said circuit, a plurality of current coils, separate means for connecting said coils to said circuit so that the current in each is responsive in phase to a different current of said circuit, and regulating means responsive to variations in the magnitude of the vector sum of the fluxes produced by all of said coils.

13. A power factor regulating system having, in combination, a three-phase circuit, a potential coil connected to be responsive to the voltage between two of the conductors of said circuit, a pair of current coils connected to be responsive to the current in each of the said conductors respectively and means operable in accordance with variations in the magnitude of the vector sum of the fluxes produced by all three of said coils.

In witness whereof, I have hereunto set my hand this 8th day of November, 1929.

FRED H. WINTER.